United States Patent [19]
Newton

[11] Patent Number: 5,598,701
[45] Date of Patent: Feb. 4, 1997

[54] FRANGIBLE CONNECTION FOR A THRUST REVERSER FOR A DUCTED FAN GAS TURBINE

[75] Inventor: Arnold C. Newton, Derby, England

[73] Assignee: Rolls-Royce plc, London, England

[21] Appl. No.: 381,493

[22] Filed: Jan. 31, 1995

[30] Foreign Application Priority Data

Feb. 1, 1994 [GB] United Kingdom ............... 9401836

[51] Int. Cl.⁶ ............................................... F02K 3/02
[52] U.S. Cl. .................. 60/226.2; 60/230; 60/228; 244/110 B; 239/265.15; 239/265.29
[58] Field of Search ............................. 60/226.2, 230, 60/39.01, 228; 244/110 B; 239/265.15, 265.27, 265.29, 265.13, DIG. 22

[56] References Cited

U.S. PATENT DOCUMENTS

| | | | |
|---|---|---|---|
| 3,475,913 | 11/1969 | Mortlock et al. | 60/226.2 |
| 3,483,702 | 12/1969 | Ward | 60/226.2 |
| 3,736,750 | 6/1973 | Britt | 60/226.2 |
| 3,844,482 | 10/1974 | Stearns | 60/226.2 |
| 3,907,224 | 9/1975 | Stearns | 60/226.2 |
| 4,137,711 | 2/1979 | Montgomery | 60/226.2 |

FOREIGN PATENT DOCUMENTS 2335126   2/1974   Germany ................... 239/265.15

Primary Examiner—Michael Koczo
Assistant Examiner—Ted Kim
Attorney, Agent, or Firm—Cushman Darby & Cushman, L.L.P.

[57] ABSTRACT

A ducted fan gas turbine engine is provided with a thrust reverser which comprises doors which deflect the fan exhaust efflux. Each door is pivotably attached at its downstream end to a common support member by a frangible coupling. In the event of an unintended in-flight deployment of the thrust reverser, the frangible couplings fracture to permit the doors to move to a non-thrust deflecting position.

7 Claims, 2 Drawing Sheets

FRANGIBLE CONNECTION FOR A THRUST REVERSER FOR A DUCTED FAN GAS TURBINE

FIELD OF THE INVENTION

This invention relates to a thrust reverser for a ducted fan gas turbine engine and in particular to a thrust reverser which is adapted to fail safe in the event of its inadvertent deployment.

BACKGROUND OF THE INVENTION

Ducted fan gas turbine engines suitable for aircraft propulsion are frequently provided with a thrust reverser. Typically the thrust reverser is a mechanical device which, when operative, deflects at least a portion of the exhaust efflux of the engine in such a direction as to provide retardation of the aircraft carrying the engine. Such retardation is necessary in order to economise on the use of frictional braking systems when the aircraft carrying the engine lands. Frictional braking systems, which are normally in the form of disc brakes fitted to the aircraft's wheels, are subject to expensive wear as are the tires of the braked wheels.

While thrust reversers are an attractive alternative to frictional methods of aircraft braking, they are potentially hazardous to flight safety if they are inadvertently deployed during flight. Measures are therefore taken to ensure that the possibility of this happening is minimised. Typically, such measures include providing the aircraft's undercarriage with electrical switches which indicate whether the aircraft is on the ground. The switches are linked to the control systems of the aircrafts engines so that the thrust reversers are disabled when the aircraft is not on the ground. However, such switches and their associated equipment are not completely failsafe.

SUMMARY OF THE INVENTION

It is an object of the present invention to provide a thrust reverser for a ducted fan gas turbine engine which fails safe in the event of its inadvertent deployment during flight.

According to the present invention, a ducted fan gas turbine engine for aircraft propulsion includes a thrust reverser, said thrust reverser comprising a plurality of doors which are each pivotable between a first, deployed position in which they deflect at least part of the exhaust efflux of said engine to provide aircraft braking and a second, stowed position in which they do not provide such exhaust efflux deflection, said doors being attached to the remainder of said engine for said pivotable movement by frangible couplings, said frangible couplings being selected to be of such strength that they fracture to release said doors from said first deployed position in the event that said thrust reverser is deployed when the airspeed of said engine is above a predetermined level, means being provided to maintain the attachment of said doors to said engine in a substantially non-thrust deflecting manner following such a fracture of said frangible couplings.

BRIEF DESCRIPTION OF THE DRAWINGS

The present invention will now be described, by way of example, with reference to the accompanying drawings in which.

DETAILED DESCRIPTION OF THE INVENTION

Figure 1:
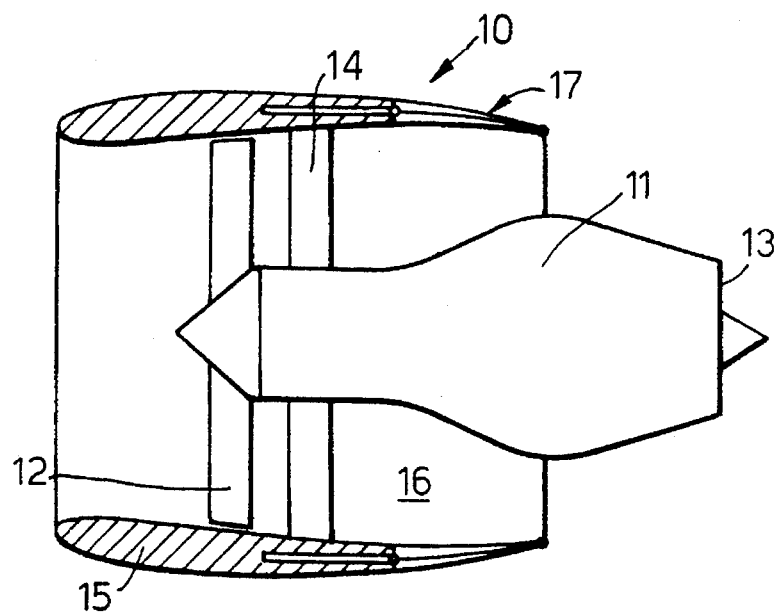
FIG. 1 is a diagrammatic sectional side view of a ducted fan gas turbine engine having a thrust reverser in accordance with the present invention.

With reference to FIG. 1, a ducted fan gas turbine engine generally indicated at 10 is of generally conventional configuration. It comprises a core gas generator 11 which drives a propulsive fan 12. The hot gas exhaust from the gas generator core 11 is expelled through a nozzle 13 provided at the downstream end thereof to provide additional propulsive thrust. Immediately downstream of the fan 12 there is provided an annular array of radially extending outlet guide vanes 14. The outlet guide vanes perform a dual role. Firstly they act upon the airflow exhausted from the fan 12 in order to de-swirl and re-direct it in a generally axial direction. Secondly they support an annular, axially extending cowling 15 which surrounds the fan 12 and the upstream part of the core 11.

The core 11 and the cowling 15 cooperate to define an annular fan duct 16 through which air accelerated by the fan 12 is exhausted to atmosphere to provide the majority of the propulsive thrust of the gas turbine engine 10.

Under normal flight conditions, the gas turbine engine 10 is configured in the manner shown in FIG. 1. However when the aircraft carrying the engine 10 lands, a thrust reverser 17 provided at the downstream end of the cowling 15 is deployed in order to provided braking of the aircraft. The configuration of the thrust reverser 17, when deployed, is shown in FIG. 2.

The thrust reverser 17 comprises a plurality of radially inner and outer doors 18 and 19 respectively. The doors 18 and 19 are arranged in pairs in a generally annular array around the downstream end of the cowling 15 so that each radially inner door 18 is paired with a corresponding radially outer door 19. Each pair of doors 18 and 19 is pivotally attached at its downstream end to a common support ring 20 which can be seen in FIG. 4. The support ring 20 defines the downstream edge of the cowling 15 and is attached to the remainder of the cowling 15 by a plurality of axially extending support members (not shown).

Figure 4:
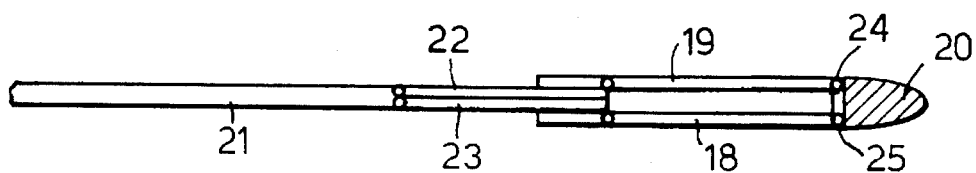
FIG. 4 is a view on an enlarged scale of the operating mechanism of the thrust reverser of the ducted fan gas turbine engine shown in FIG. 1 when the stowed, non-deployed position.

When the thrust reverser 17 is in its non-deployed configuration as can be seen in both FIGS. 1 and 4, the thrust reverser doors 18 and 19 of each pair lie generally alongside each other so that they define parts of the radially inner and outer surfaces of the cowling 15. Thus the thrust reverser doors 18 and 19, when not deployed, provide no deflection of the airflow through the fan duct 16.

Figure 2:
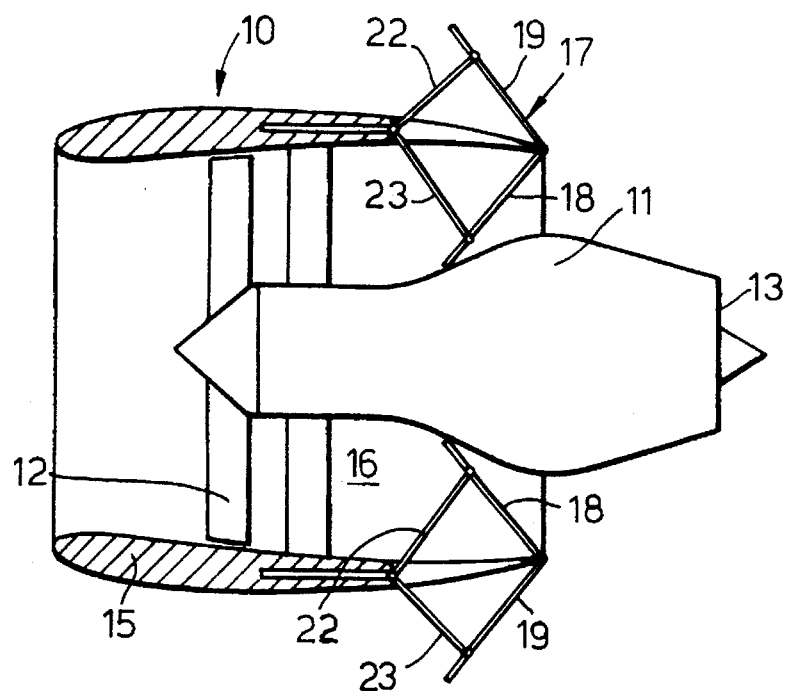
FIG. 2 is a view similar to that shown in FIG. 1 in which the thrust reverser is shown in the deployed, thrust deflecting position.
Figure 5:
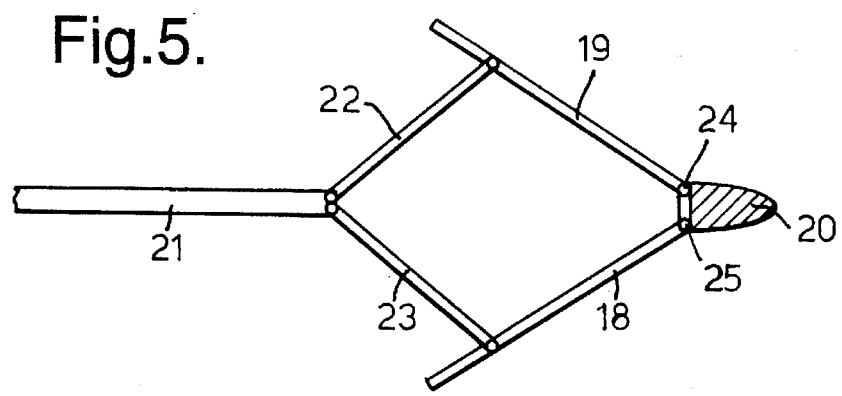
FIG. 5 is a view of the operating mechanism shown in FIG. 4 when in the deployment, thrust deflecting position.

Deployment of the thrust reverser 17 results in the thrust reverser doors 18 and 19 of each pair pivoting away from each other about the support ring 20 until they reach the positions shown in FIGS. 2 and 5. This is achieved by the translation in an axially downstream direction of a plurality of actuation arms 21; one arm being associated with each pair of thrust reverser doors 18 and 19. More particularly each actuation arm 21 is interconnected with its associated thrust reverser door pair 18 and 19 by two link arms 22 and 23. Each of the link arms 22 and 23 is pivotally attached at one end to the downstream end of the actuation arm 21. The opposite ends of the link arms 22 and 23 are respectively pivotally attached to the thrust reverser doors 18 and 19. When the actuation arms 21 are axially translated by, for example, hydraulic rams, they cause the link arms 22 and 23 to pivot the thrust reverser doors 18 and 19 about the support ring 20 until the doors 18 and 19 reach their fully deployed positions shown in FIGS. 2 and 5. Axial translation of the actuation arms 21 in the opposite upstream results in the thrust reverser doors 18 and 19 returning to their stowed positions shown in FIGS. 1 and 4.

Figure 3:
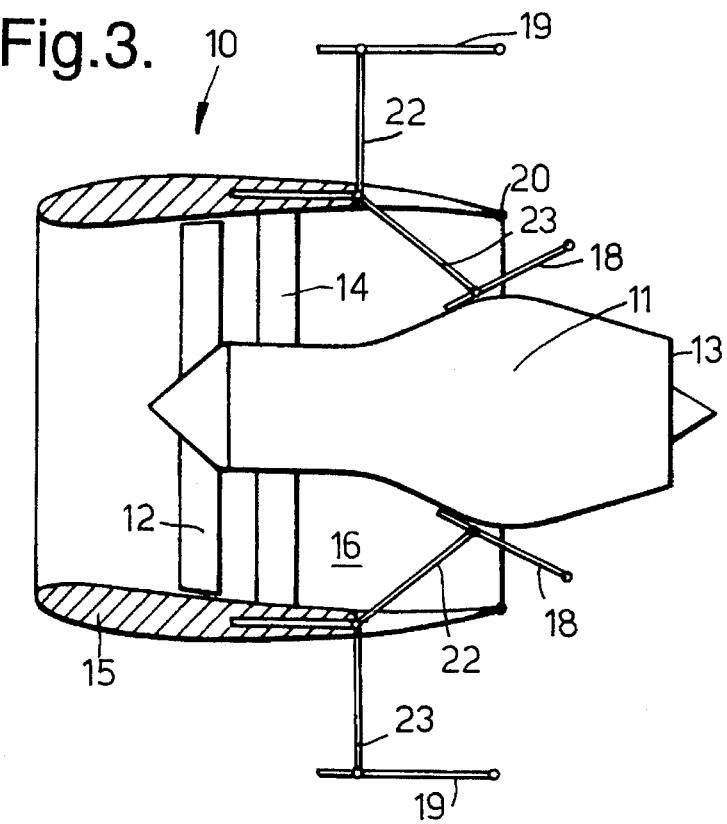
FIG. 3 is a view similar to that shown in FIG. 2 in which the thrust reverser is shown in the failed non-deflecting position following inadvertent deployment.

If the thrust reverser 17 is inadvertently deployed while the aircraft powered by the engine 10 is in flight, major, undesirable loading would be imposed upon the aircraft. In order to preclude this eventuality, the pivotal couplings 24 and 25 between the thrust reverser doors 18 and 19 respectively and the support ring 20 are arranged to be frangible. In the event therefore of inadvertent in-flight thrust reverser 17 deployment, the pivotal couplings 24 and 25 will fail. This will leave the link arms 22 and 23 as the only means for interconnecting the thrust reverser doors 18 and 19, and the engine cowling 15. The thrust reverser doors 18 and 19 thereby assume the positions shown in FIG. 3 providing minimal disruption to the air flow through the fan duct 16.

The frangible pivotal couplings 24 and 25 are so arranged that they only fail when subjected to the very high loads which are imposed during in-flight thrust reverser deployment. They therefore do not fail when the thrust reverser 17 is deployed in the conventional manner upon aircraft landing.

It will be seen therefore that in the event of an inadvertent in-flight thrust reverser 17 deployment, the thrust reverser doors 18 and 19 will pivot to safe, non-thrust deflecting positions and are not detached from the gas turbine engine 10 to cause damage elsewhere.

I claim:

1. A ducted fan gas turbine engine for aircraft propulsion, said engine including a thrust reverser comprising a plurality of doors which are each pivotable between a first, deployed position in which said doors deflect at least part of the exhaust efflux of said engine to provide aircraft braking, and a second, stowed position in which said doors do not provide such exhaust efflux deflection, said doors being attached to the remainder of said engine for said pivotal movement by frangible couplings, said frangible couplings being selected to be of such strength that said frangible couplings fracture to release said doors from said first, deployed position in the event that said thrust reverser is deployed when the airspeed of said engine is above a predetermined level, means being provided to maintain the attachment of said doors to said engine in a substantially non-thrust deflecting manner following such a fracture of said frangible couplings, by allowing pivoting of said doors to said non-thrust deflecting position.

2. A ducted fan gas turbine engine as claimed in claim 1 wherein said thrust reverser is so arranged as to provide deflection of at least part of the exhaust efflux of the fan of said engine when in said first, deployed position.

3. A ducted fan gas turbine engine as claimed in claim 2 wherein said engine includes a cowling which partially encloses the remainder of said engine, said thrust reverser doors defining a portion of said fan cowling.

4. A ducted fan gas turbine engine as claimed in claim 3 wherein a common support member is provided to support said doors, said doors being arranged in pairs, the doors of each pair being pivotally attached at their downstream ends to said common support member so as to be pivotable between said first deployed position and said second, stowed position.

5. A ducted fan gas turbine engine as claimed in claim 4 wherein one door of each of said pairs of doors defines part of the radially outer surface of said cowling and the other door of each of said pairs of doors defines part of the radially inner surface of said cowling.

6. A ducted fan gas turbine engine is claimed in claim 4 or claim 5 wherein each of said doors is pivotably attached at its downstream end to said common support member by one of said frangible couplings.

7. A ducted fan gas turbine engine as claimed in claim 6 wherein link arms are provided to interconnect the upstream region of each Of said doors with said cowling to provide said means to maintain the attachment of said doors to said engine following the fracture of said frangible couplings.

* * * * *